June 9, 1964 R. G. MUNROE 3,136,523
TRANSFORMER MOUNTING
Filed April 23, 1962
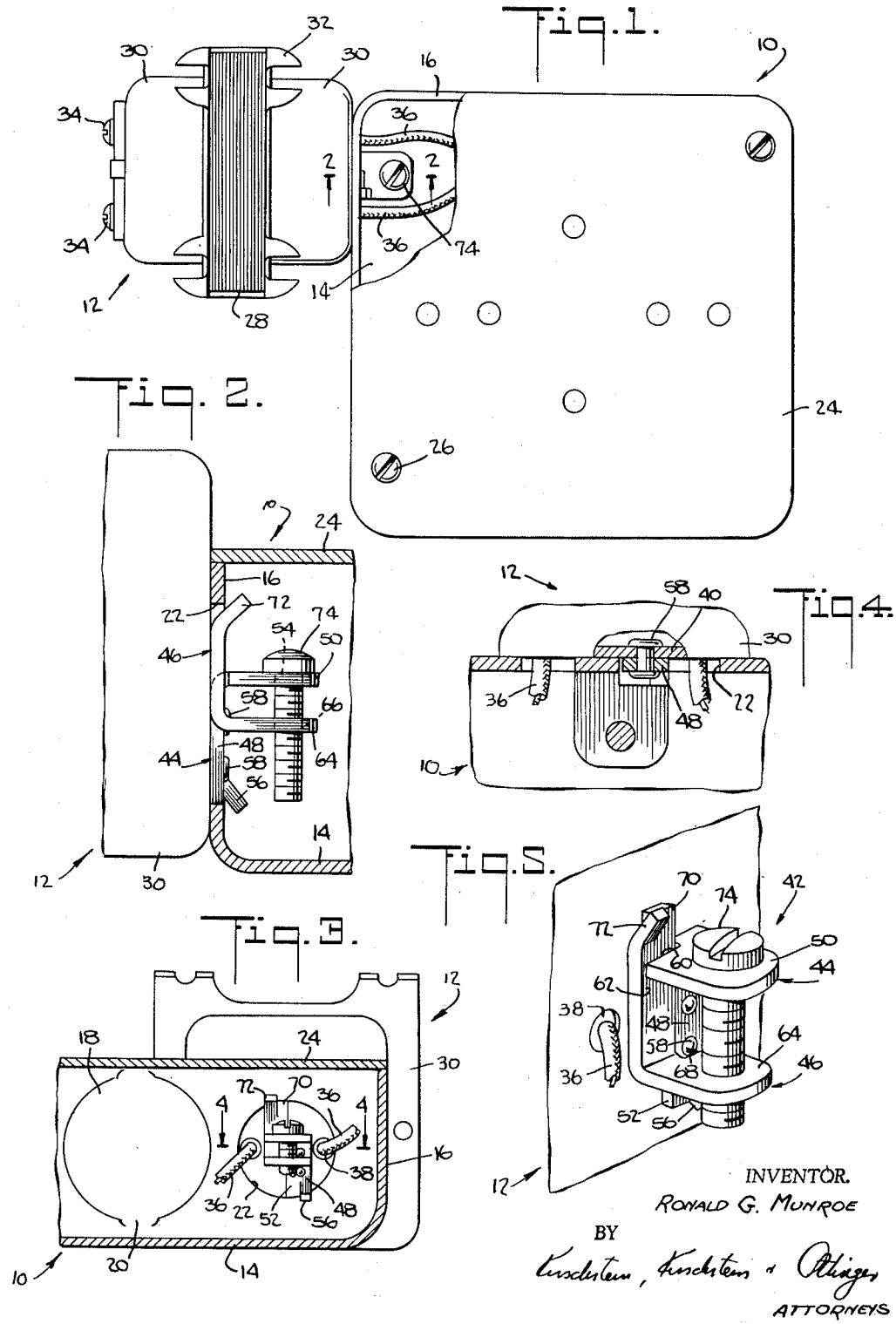
INVENTOR.
RONALD G. MUNROE
BY
ATTORNEYS

United States Patent Office 3,136,523
Patented June 9, 1964

3,136,523
TRANSFORMER MOUNTING
Ronald G. Munroe, Oldbridge, N.J., assignor to Eagle Electric Mfg. Co., Inc., Long Island City, N.Y., a corporation of New York
Filed Apr. 23, 1962, Ser. No. 189,470
6 Claims. (Cl. 248—360)

This invention relates to a transformer mounting, and, more particularly, is concerned with a mounting for a so-called "bell transformer," i.e., a transformer that is employed to furnish power to bells, buzzers, chimes, heating control circuits and similar electrical devices and equipment that utilize voltages which are considerably lower than the normal 110 volt or 220 volt conventional house supplies.

Specifically, my invention pertains to a mounting for securing a low voltage transformer directly to a metal connector box (also known as a "conduit," "outlet" or "junction box"). Connector boxes are sheet metal enclosures in which underwriters or local electric codes require that connections between wires, or between wires and switches or convenience outlets, be housed in order to reduce fire hazard at such danger points of the electric power distribution system. Such a box conventionally comprises a base wall peripherally surrounded by a continuous side wall defining a shell with one open side that is removably closed by a detachably mounted cover. The side walls have partially blanked out discs known as "knock out" discs which when completely broken away from the connector box leave knock out openings through which wiring customarily runs into the box.

Although a low voltage transformer usually is provided with mounting means for securing the transformer, as with the aid of screws or nails to a wooden support, or with the aid of lag bolts or the like to concrete, cement or cinder block supports, the better practice is to attach a low voltage transformer directly to a connector box whereby the high voltage input leads may be extended from the transformer through an immediately adjacent knock out opening into the interior of the box where its energizing connection is made to the house electrical main so that not only will the high voltage supply wiring for the transformer be entirely concealed within the box, but the length of this wiring can be kept to a minimum.

To the foregoing end, a transformer box mounting heretofore has been proposed wherein the mounting consisted of an internal clamp composed of a shank with angled ends. The shank was rigidly attached to the transformer casing and was adapted to be inserted through a knock out opening so that one angled end of the clamp would be located inside the box and would wedge a part of the wall of a knock out opening between such end and the transformer casing. The other angled end of the clamp also would be located inside the box, this end being tapped to receive a set screw. The tip of the set screw was cupped and was so supported that it would be forced into engagement from a point inside the box with a diametrically opposite part of the wall of the knock out opening. Such mounting although based upon an excellent concept, to wit, the idea of directly securing a low voltage transformer to a connector box with the aid of and through a knock out opening, suffered from its particular mode of execution. The principal drawback to the proposed construction was that the cupped tip of the screw multilated, that is to say, "chewed up," the part of the wall of the knock out opening engaged by it.

The sheet metal of a box connector is rather thin and rather soft. Also a screw has a considerable mechanical advantage, and furthermore the applied force is highly localized by the cupped shape of the tip of the screw. Due to all of these factors even the limited force that can be applied by hand through the medium of a screwdriver easily can severely deform the part of the knock out opening upon which the tip of the screw bears. As a result, when, for any reason, as for example, burning out of a winding, a transformer is replaced, removal of the defective transformer often will leave the wall of the knock out opening too weak or too enlarged to support a new transformer. Indeed, if too much force is applied to the screw initially, the connector box may be damaged so severely that it will not even firmly hold the first transformer thus mounted.

In addition, the described mounting only is capable of being used to secure a bell transformer to a knock out opening of one certain size and cannot be employed with other openings of different sizes, it being noted in this connection that it is usual in the trade to provide more than one size of opening in an ordinary connector box so that the electrician may not be able to mount the transformer at a preferred site but will be limited to a site where there is available an opening of that certain size to which said described mounting only can be connected. Furthermore, if the transformer should be slightly tilted as the screw is being tightened the cupped tip of the set screw will not engage the corner of the wall of the knock out opening at a proper angle and will not, therefore, grip the box as securely as it should, whereby the transformer may come loose if accidentally struck. Also, a tilting of the transformer during tightening of the set screw may direct the cupped tip at such an angle that it will shear away a part of the opening and thus destroy the usefulness of the box for mounting of the bell transformer. Another difficulty with the previous mounting is that even if all parts are correctly positioned, but the metal of the box is a little too thin or the knock out opening is a little too large or the set screw is tightened a little too much, the mounting, although seemingly firm and secure, will not resist the stress of an inadvertent blow and may loosen and become detached, creating a fire hazard.

Moreover, because the set screw is held at an angle to the side wall of the connector box force created thereby is directed outwardly, thus imposing a laterally outward stress on the wall of the opening which the wall is inherently least able to resist so that even under the most favorable conditions, the aforesaid previous mounting is not truly reliable.

It is an object of my present invention to provide a new transformer mounting which overcomes all of the foregoing drawbacks.

It is another object of my invention to provide a new transformer mounting of the character described which constitutes relatively few and simple parts, is easy to make and install, and which effects an unusually secure attachment to the wall of a knock out opening of a connector box.

It is another object of my invention to provide a new transformer mounting of the character described which minimizes any tendency to deform the wall of a knock out opening, whereby the mounting will not be inclined to come loose and whereby successive transformers employing such new mountings can be secured to a single knock out opening without mutilating the opening to a state where it no longer can be used.

It is another object of my invention to provide a new transformer mounting of the character described which exerts no laterally outward stress on the wall of the connector box so that there is no tendency to deform either the wall or the knock out opening.

It is another object of my invention to provide a new transformer mounting of the character described which will automatically adapt itself for use with knock out openings of a range of different diameters so that the transformer can be attached to the box at the most convenient site available where a knock out opening of any size is disposed.

It is another object of my invention to provide a new transformer mounting of the character described including a safety feature which even if the transformer mounting should become loose would prevent the transformer from becoming fully detached from the connector box.

It is another object of my invention to provide a new transformer mounting of the character described in which the engagement between the mounting and the walls of the knock out opening is over a far broader area than the tip of a set screw so that highly localized stresses are not engendered.

It is another object of my invention to provide a transformer mounting of the character described which is susceptible of being employed in association with any standard low voltage transformer.

Other objects of my invention in part will be obvious and in part will be pointed out hereinafter.

My invention accordingly consists in the features of construction, combinations of elements and arrangements of parts which will be exemplified in the device hereinafter described and of which the scope of application will be indicated in the appended claims.

In the accompanying drawings in which is shown one of the various possible embodiments of my invention, FIG. 1 is a partly broken away front face view of a standard connector box to which a conventional low voltage transformer has been attached by means of a transformer mounting embodying my invention;

FIG. 2 is an enlarged fragmentary sectional view taken substantially along the line 2—2 of FIG. 1;

FIG. 3 is an enlarged fragmentary sectional view taken from inside the connector box and looking outwardly toward the transformer and its mounting;

FIG. 4 is an enlarged fragmentary sectional view taken substantially along the line 4—4 of FIG. 3; and FIG. 5 is a perspective view of my unique transformer mounting.

In general I achieve the several objects of my invention by employing a transformer mounting which essentially comprises an expansion brace. More particularly, I provide a transformer mounting comprising five principal elements which are: (1) a first stationary member having a first portion adapted to engage a first region of a wall of a knock out opening under outward radial pressure in the plane of said opening; (2) a means for permanently and rigidly securing the first member to an exterior part of a low voltage transformer; (3) a second movable member having a second portion coplanar with the first wall engaging portion and adapted to engage a wall of a knock out opening at a second region diametrically opposed to the first region engaged by the first wall engaging portion, said second portion likewise engaging the second region under outward radial pressure in the plane of said opening; (4) means mounting the second member for movement relative to the first member in a direction approximately parallel to the line between the wall engaging portions of the two members; and (5) a manipulatable element engaging said second member and a stationary part, optionally said first member, and so connected to said second member that rotation of said element causes said second member to move relative to said first member in a direction to move the wall engaging portions of said two members toward or away from one another depending upon the direction of rotation of said element. Thereby, the element can be turned in one direction to draw the two wall engaging parts together closely enough to permit them to be inserted into a knock out opening. Such insertion is limited by disposal of the two members immediately adjacent the low voltage transformer so that the exterior wall of the transformer on which the members are located serves as an abutment in cooperation with the external face of the connector box to position the two wall engaging portions in the plane of the knock out opening. Then by turning the element in the opposite direction the two wall engaging portions are moved away from one another until they press radially outwardly against diametrically opposed regions of the walls of the knock out opening, thus acting as an expansion brace.

Furthermore, as a safety feature, I prefer to incorporate on each of the two aforesaid members, i.e., the fixed and the movable member, a tongue the tip of which is offset outwardly from the transformer and extends beyond the wall engaging portion of the associated member whereby said tip at such time as the expansion brace is actuated to firmly engage the walls of the knock out opening will extend beyond the walls of the opening so as to lie behind the internal surface of the wall of the connector box around the knock out opening and, accordingly, prevent inadvertent withdrawal of the transformer mounting even if the expansion brace should become loose.

Referring now in detail to the drawings, the reference numeral 10 denotes a typical traditional connector box and the reference numeral 12 denotes a typical traditional low voltage transformer, e.g. of the bell ringing type.

The connector box 10 comprises a sheet metal base wall 14 of any suitable configuration, e.g. square as indicated, and which is provided with a peripheral upstanding flange 16 which thereby provides four side walls. Each of the side walls includes one or more, usually three or more, partially sheared away knock out discs 18, connected, as by tabs 20, to the material of the side wall. The tabs are rather narrow and are partially sheared away so that it requires very little effort to fracture the neck of the tab and thereby leave a knock out opening 22. Various openings may be of different diameters, e.g., of two different diameters as illustrated in FIG. 3. The openings traditionally are circular.

The side of the connector box opposite to the base wall is open but is covered by a flat lid 24 held to the connector box, as by screws 26 the shanks of which engage tapped openings in inwardly turned ears (not shown) integral with the top edges of opposite side walls of the box.

The low voltage transformer 12 may assume any one of a large number of shapes and constructions and will vary in design from one manufacturer to another. However, essentially all transformers are functionally the same. Thus they all include a magnetic core 28 which usually is laminated. They all include wire windings, to wit, primary and secondary windings associated with the core. These windings are protected and concealed within caps 30 disposed on opposite sides of the core, the caps constituting rather thin sheet metal. Portions of the caps are fashioned with slotted feet which adapt the transformer for mounting on a flat surface with the aid of attaching means such as nuts, screws or bolts. These are not used when the mounting of my present invention is employed. The transformer has the usual low voltage output terminals 34 and the usual high voltage input leads 36, these latter extending through insulated bushings 38 secured in a flat end wall 40 (see FIG. 4) of a cap 30 of the transformer.

Pursuant to my invention I provide this otherwise standard transformer with an expansion brace transformer mounting 42. Said mounting includes a first stationary member 44 and a second movable member 46.

The stationary member 44 is fabricated from any suitable sturdy material, e.g., sheet steel, and preferably has a thickness of the same order as the thickness of the sheet metal used to fabricate the connector box 10. Said stationary member 44 has a body 48 of flat configuration. At one end the body is provided with a post 50 that extends away from the transformer cap 30 in a direction into the interior of the connector box when the transformer is mounted thereon in a manner which will be described hereinafter. Desirably, the post 50 is perpendicular to the plane of the body 48.

At the end of the body opposite from the end at which the post is located, I narrow the body so as to provide a first wall engaging portion or presser foot 52. The thickness of this foot is, as indicated above, approximately equal to the thickness of the wall of the connector box. The width of the tip of the foot is slight, a satisfactory width being about three-sixteenths of an inch. Said tip can be slightly rounded to present an externally convex curvature in the order of the radius of the curvature of the knock out opening of a connector box. Such curvature of the tip, if provided, does not have to exactly match the curvature of any one of the openings, and indeed my invention performs satisfactorily where the tip of the presser foot is flat since the area of contact therewith the connector box, although considerably greater than that of the cupped tip of a set screw, still is rather small.

The post 50 is formed with an untapped (clear) through aperture 54 the purpose of which soon will be pointed out.

The body 48 of the first stationary member also includes a safety extension 56 which projects from the body in the same general direction as the presser foot 52 but is angled away (offset outwardly) from the cap 30 as best is seen in FIG. 2. The extension 56 is longer than the presser foot and therefore projects further from the body 48 then does said foot. The angle of the safety extension is such that the level of the surface of said extension which faces toward the cap of the transformer is spaced slightly further from said cap at the tip of the presser foot than is the outer surface of the presser foot (see FIG. 2). This additional spacing is quite small, for example in the order of one thirty second of an inch. An explanation of the purpose of such spacing will be given hereinafter.

The first stationary member 44 is rigidly and firmly secured to an end wall of a transformer cap 30. The means to effect such securement may constitute a pair of rivets 58 that extend through the body 48 and through the end wall 40 of the cap, the opposite ends of said rivets being headed (see FIG. 4). It will be appreciated that any alternate means can be used, as for example self-tapping screws, brazing or welding. Attention is called to the fact that one surface of the body 48 abuts, i.e., is in face-to-face contact with, the outer surface of the end wall 40. This arrangement will, as will be mentioned later, enable said outer surface of said end wall of the cap to act as an insertion limiting member (abutment) when the transformer is coupled to the connector box with the assistance of my unique transformer mounting.

The post 50 which is in one piece with the body 48 is wider than said body, e.g. almost twice as wide, and at the base of the post the first stationary member 44 is formed with a cut out or notch 60 (see FIG. 5) in the plane of the body 48. The breadth of the notch, that is to say the distance from the long wall of the notch to the outer surface of the end wall 40 of the transformer cap is slightly greater than the thickness of the body 48 and the notch is straight and has parallel walls whereby said notch is adapted to form a guide.

The second movable member 46 has a shape which very much resembles that of the first stationary member 44. More particularly, the second movable member comprises a body 62 the thickness of which is equal to that of the body 48. The width of the body 62 is approximately equal to the depth of the notch 60 and said body is received within said notch with one long edge of the body in slidable contact with the juxtaposed long edge of the body 48 of the first stationary member 44. In effect, therefore, the aforesaid long edge of the body 48 and the notch 60 form a means that guides the second stationary member 46 for movement relevant to the first stationary member in a direction substantially parallel to the direction of extension of the presser foot 52 away from the body 48.

The body 62 likewise includes a post 64 similar to the post 50, that is to say at right angles to the body 62. The post 64 is provided with a tapped aperture 66 in registration with the clear (untapped) aperture 54, the tapped aperture being of slightly smaller diameter. The planes of the two posts 50, 64 are parallel to one another and are perpendicular to the direction of relative movement of the two members 44, 46. The post 64, which is one piece with the body 62, is wider than said body and in the same fashion that the post 50 laterally overhangs the body 62, the post 64 laterally overhangs the body 58.

Moreover, said post 64 is provided with a notch 68 to slidably accommodate the body 48. Thus this notch 68 aids in guiding movement of the two members 44, 46 relative to one another. If desired, the notch 68 may be made a little broader than the notch 60 to permit easy passage of the exposed heads of the rivets 58 inasmuch as a sufficient guiding connection has been found to be obtained by sliding contact of the two bodies and by cooperation of the body 62 with the notch 60, in addition to the rotary element soon to be described, so that the additional guiding action of the notch 68 is not necessary. However, it is within the scope of my invention to have the breadth of the notch 68 just slightly greater than the thickness of the body 48 so that a nice sliding fit is obtained here as in the case of the notch 60 and body 62 and should such an arrangement be employed the outer heads of the rivets 58 are countersunk in the body 48.

The second movable member 46 is additionally similar to the first stationary member 44 in that the body 62 is provided with a presser foot 70 of the same configuration as the presser foot 52. The presser foot 70 extends away from its body 62 in a direction opposite and parallel to the direction of extension of the presser foot 52 from its body 48. Since the two bodies are in rubbing contact it may be deemed that, in essence, the presser feet 52, 70, are aligned although in actuality they are slightly offset.

The tip of the presser foot 70 preferably is of the same size and shape as the tip of the presser foot 52, that is to say, narrow and, optionally, flat as shown, or if desired slightly rounded so as to be externally convex.

The body 62 further is provided with an angled safety extension 72 which has a size and relationship with respect to the presser foot 70 that is the same as the size and relationship of the safety extension 66 with respect to the presser foot 52 and therefore will not be redescribed.

The manipulatable element for causing the two members 44, 46 to experience relative movement comprises a headed screw 74, the shank of which meshes with the tapped aperture 66 but passes slidably through the untapped, i.e., clear aperture 54.

From the foregoing it will be apparent that if the head of the screw 74 bears against the post 50 rotation of said screw will cause the movable member 46 to slide alongside of the stationary member 44. If the screw 74 has the usual righthand thread, turning the screw in a clockwise direction will draw the post 64 toward the post 50. This will cause the two presser feet to move apart and since, as very shortly will be pointed out, opening movement of the presser feet will brace the transformer mounting in a knock out opening, such clockwise movement which is the natural tightening movement of a screw will tighten the transformer mounting on the connector box. Similarly, counterclockwise movement of the screw will loosen the transformer mounting. Accordingly, an electrician does not have to be specially instructed to turn this screw correctly for tightening or loosening the transformer mounting but will secure this effect in a perfectly natural manner.

I also wish to observe that since the shank of the screw 74 is a nice slidable rather than a very loose fit in the clear aperture 54 the screw aids in guiding the movable member for motion relative to the stationary member.

To mount a transformer 12 having my novel expansion brace 42 I first determine a desirable location on the connector box and remove the disc 18 closest to this location to leave a clear knock out opening 22. If the presser feet are not already in retracted position I employ a screw driver to turn the screw 74 in a counterclockwise direction and thereby move the tips of the two presser feet toward one another. This inward movement of the presser feet is continued as far as the mechanism will permit or at least until the tips of the safety extensions 56, 72 are spaced apart a distance less than the diameter of the knock out opening to be used.

Now the expansion brace 42 is introduced into the selected knock out opening with the transformer located, of course, on the outside of the connector box. The brace is inserted into the opening as war as it will go, the inward movement being limited by abutment of the external surface of the end wall 40 of the transformer cap against the external surface of the side wall of the connector box in which the knock out opening is disposed. Inasmuch as the thickness of the presser feet is approximately equal to the thickness of the walls of the connector box, the presser feet now will be approximately in the plane of the wall of the selected knock out opening. However, the tips of the presser feet will be spaced apart by a distance which is less than the diameter of said knock out opening. The presser feet will at this time due to their substantial alignment be facing diametrically opposed regions of the wall of the knock out opening.

Next the screw 74 is turned clockwise. This will cause the tips of the presser feet to move apart until they contact, i.e., strike or engage, diametrically opposed regions of the wall of the knock out opening. A little further pressure will make this engagement extremely firm and secure. Indeed the tips of the presser feet may imbed themselves slightly into the walls of the opening. This, of course, is not necessary but I mention it because it will be seen that if they do become imbedded the amount of imbedment is tiny and does not mutilate the knock out opening to such an extent that it cannot be reused to mount a fresh transformer employing a similar expansion brace.

It will be observed that this contact pressure is radial of the knock out opening and is in the plane of the wall of the connector box containing the knock out opening, the metal of said box being best able to resist a stress so oriented. Accordingly, the deformation of the wall of the knock out opening consequent upon employing my expansion brace mounting is minimal and the deformation is not in such a direction as to weaken the connection or to so deform the knock out opening that it may not be capable of effecting a subsequent coupling connection.

It will be obvious that the input high voltage leads 36 are threaded through the knock out opening before the actual attachment of the transformer is effected through the medium of the expansion brace 42.

Despite the very firm connection that is brought about by the using of my expansion brace it will be realized that if a powerful blow is accidentally directed against the transformer, for instance if the transformer is heavily struck by a misdirected hammer, the presser feet may be knocked out of engagement of the wall of the opening since there is essentially nothing but a fact-to-face heavy frictional contact. It is for this reason that I have employed the safety extensions 56, 72. It will be recalled that these extensions are angled away from the cap and are longer than the presser feet. Hence in the installed position of the transformer, see for example FIGS. 2 and 3, the tips of the safety extensions are disposed in back of the wall of the connector box surrounding the knock out opening, that is to say, they overhang this wall whereby to prevent any appreciable movement of the transformer and its mounting away from the connector box. Actually the surfaces of the safety extensions which face the inside of the wall of the connector box containing the knock out opening which is being employed are spaced slightly inwardly from said wall of the connector box, as noted previously, by a distance in the order of for example, one thirty second of an inch, this distance being less than the thickness of the wall of the connector box so that before the tips of the presser can lose contact with the wall of the knock out opening the aforesaid surfaces of the safety extensions will abut the wall of the connector box containing said knock out opening and prevent further withdrawing movement. However, in the normal use of my expansion brace the safety extensions are not intended to bear against the connector box.

It thus will be seen that I have provided a transformer mounting which achieves the several objects of my invention and is well adapted to meet the conditions of practical use.

As various possible embodiments might be made of the above invention and as various changes might be made in the embodiment above set forth it is to be understood that all matter herein described or shown in the accompanying drawings is to be interpreted as illustrative and not in a limiting sense.

Having thus described my invention, I claim as new and desire to secure by Letters Patent:

1. For use in attaching a transformer having an exterior part to a connector box having a wall with a knockout opening therethrough: that improvement comprising, an expansion brace transformer mounting, said mounting including a stationary member, means for rigidly securing said stationary member to said exterior part of the transformer in contact therewith, a movable member, means for mounting said movable member for parallel slidable movement in the plane of the knock-out opening relative to said stationary member, and a manipulatable rotatable element engageable with the movable member and with a part functionally integral with the stationary member, said element and said members being so mutually arranged that rotation of said element will slidably move the movable member relative to the stationary member, each of said members having a presser foot, one presser foot moving toward or away from the other presser foot upon rotation of said element, said feet being adapted to be located in the plane of the knock-out opening when the exterior part of the transformer abuts the wall of the connector box and one presser foot being movable radially of the opening upon rotation of said element.

2. A transformer mounting as set forth in claim 1 wherein the presser feet are in substantial alignment.

3. A transformer mounting as set forth in claim 1 wherein the presser feet are narrow.

4. A transformer mounting as set forth in claim 1 wherein each member has an upstanding portion, wherein the manipulatable rotatable element is a screw, wherein both upstanding portions have openings that are registered, wherein one of the openings is clear and the other is tapped, and wherein the screw extends through said openings with its head abutting the portion having the clear opening and with its shank meshing with the tapped opening.

5. A transformer mounting as set forth in claim 1 wherein the two members are mutually slidable on one another.

6. A transformer mounting as set forth in claim 1 wherein each member has a post extending perpendicularly away from the exterior part of the transformer, each post having an opening therein, said opening being in registry, one of said openings being clear and the other opening being tapped, each post of one member overhanging the other member to assist in guiding the two members for relative movement, and wherein the manipulatable rotatable element includes a headed screw extending through both openings with its head bearing against the post having the clear opening and its shank meshing with the threaded opening.

References Cited in the file of this patent

UNITED STATES PATENTS

| | | |
|---|---|---|
| 231,126 | Webb et al. | Aug. 10, 1880 |
| 2,640,672 | Bedford | June 2, 1953 |
| 2,819,331 | Bladh | Jan. 7, 1958 |